Patented Nov. 13, 1934

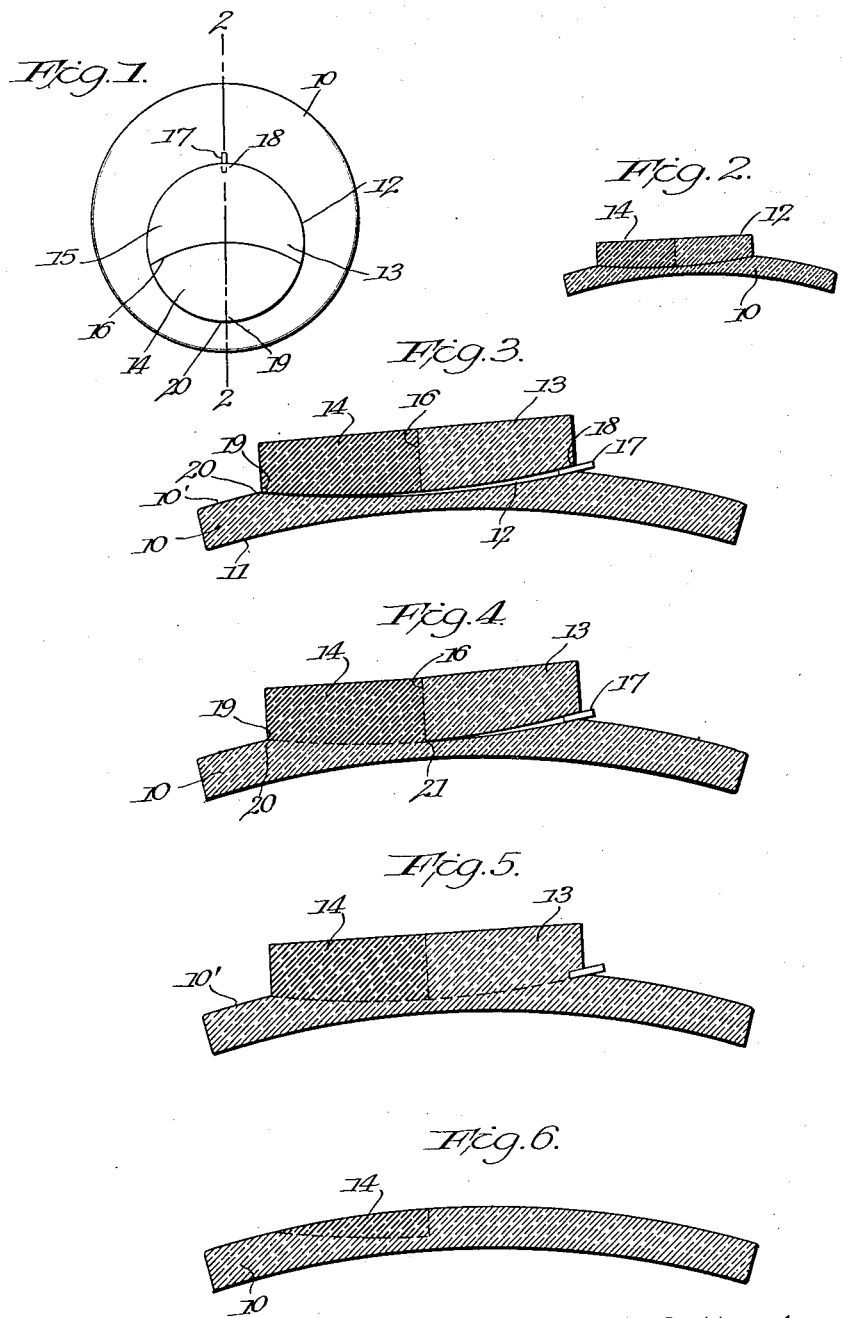

1,980,401

UNITED STATES PATENT OFFICE 1,980,401

METHOD OF FUSING BIFOCAL BUTTONS

Carl G. Haering, Petersburg, Va., assignor to Titmus Optical Company, Inc., Petersburg, Va., a corporation of Virginia Application September 25, 1933, Serial No. 690,963

5 Claims. (Cl. 49—82.1)

This invention relates to bifocal ophthalmic lenses, and to a new and improved method of making the same. More particularly, it relates to a new method of fusing a composite bifocal button to a major lens blank.

It is common practice in the art to make a bifocal lens by taking a lens blank having a definite index of refraction and grinding an eccentrically positioned, spherical countersink in its outer face; then making a composite button, comprising one segment having an index of refraction which is the same as the blank and another segment of a higher index, and fusing the button to the counter-sink with the segment of higher index positioned radially outwardly of the blank; and then grinding the outer surface of the blank and button to any desired lenticular surface. This type of lens and such a method of making the same is disclosed in the patent to Courmettes 1,160,383 Nov. 16, 1915. The present invention relates to a generally similar lens, and to a specifically improved method of manufacture.

Prior to the invention of Courmettes, it was the common practice in the art to make a fused bifocal lens by fusing a unitary flint glass button to a counter-sink in a crown glass blank to provide the necessary near vision addition. Considerable difficulty was encountered, however, in getting a smooth, clear, welded joint between the flint glass button and the crown blank. The difficulty arose because of the fact that moisture, steam or air became trapped between the surface of the molten flint glass button and the counter-sink in the blank. The button would fuse and become welded to the blank over certain areas, but other areas would be imperfectly welded, because of the presence of pockets of gas. In the early development of fused bifocal lenses using a unitary flint glass button, this difficulty was material, but it was finally solved by providing a supporting pin or feeler for the outside edge of the flint glass button, so that the button would soften, sag down, and become welded from the innermost edge, progressively outwardly across the button to the outer edge supported by the pin. The progressively spreading line of fusion would expel the gases as it travelled and prevent the same becoming entrapped in pockets. Such a method, with a simple flint glass button, is shown in the patent to Dieckman 865,363.

The remedy last referred to was found to be of no utility when applied to a composite flint-crown glass button of the Courmettes type. If the usual practice of the prior art were applied to a composite flint-crown button, and a pin placed under the radially outermost edge of the flint glass segment, it was found that the entire flint segment would soften, sag down, and become welded to the crown blank before the crown glass segment would soften at all. The crown segment would therefore be supported in direct contact with the counter-sink over its entire area, and air adhering to the surface of the counter-sink or crown segment could not escape, but would become trapped and make blemishes. The progressive welding of the button from the inner edge outwardly all the way across to the outer, pin supported edge was impossible. The fact that the flint glass segment had a lower fusing point than the crown glass segment rendered the welding method of the prior art impractical, and gave rise to a problem which was not satisfactorily solved until the present invention.

The principal object of this invention is to provide a new and entirely satisfactory method of welding a composite bifocal button, made up of two segments of glass of different indices of refraction and different fusing points, to a lens blank made up of glass of the same index of refraction and fusing point as one of the segments of the button. This object is accomplished by providing means which cause the button to be fused to the counter-sink in the lens blank progressively from the radially outer edge across the button to the inner edge. The means referred to is preferably a pin, a feeler or an equivalent spacing device, interposed between the innermost edge point of the counter-sink and the inner edge of the crown glass segment. By supporting the inner edge of the crown glass segment in spaced relation to the inner edge of the counter-sink and then subjecting the blank and button to heat, the flint glass segment, which has a lower fusing point and therefore fuses first, becomes welded to the blank by a progressively moving weld line which travels from the outermost edge point of the flint glass section thereacross to the welded line of juncture between the two segments. As the heat is continued, the crown glass segment softens and fuses with the blank by a progressively moving line which travels from the central line of juncture with the flint section across the crown section to the inner edge point supported by the pin or other spacing means. Thus, the line of fusion travels progressively across the entire surface of the composite button, from one edge to the other and forces out any air or other gases which may be present, and prevents the formation of pockets or other blemishes.

In the accompanying drawing, several stages of the method of the present invention are diagrammatically illustrated.

Figure 1 is a top plan view of a lens blank and composite bifocal button supported in accordance with the present invention.

Figure 2 is a sectional view taken on line 2—2 of Figure 1, but before the spacing pin is put in place.

Figure 3 is an enlarged vertical sectional view of the blank and button supported in the relation shown in Figure 1 and prior to the application of the fusing heat.

Figure 4 is a similar view showing the parts after they have been partially fused.

Figure 5 is a similar view showing the parts completely fused.

Figure 6 is a similar view of a lens blank made in accordance with the present invention with the outer surface ground to final form.

In the drawing, 10 indicates a crown glass lens blank having an upper spherical surface 10' and a similar lower surface 11. The upper surface of the blank is provided with an eccentrically positioned spherical countersink 12 which is adapted to receive a composite bifocal button 13. The curve of the countersink 12 may be generated on any desired radius, to provide, in combination with the subsequently ground outer surface of the complete bifocal blank, any desired power in the reading addition.

The button is made up of a flint glass segment 14, preferably in the form of a cissoid, and a crown glass, crescent-shaped segment 15. These parts are moulded roughly to the desired shape; the meeting edges are then accurately ground; and the two then welded together along the arcuate line 16. It is preferred to shape the meeting edges of the segments so that the line 16 passes directly through the center of the circular composite button. After the two segments 14, 15 have been thus welded together, the lower surface of the composite button is ground to a spherical curve corresponding to the spherical curve of the countersink 12, to give the desired power. The optical axis of the button will be located centrally on the line of juncture 16. The button is carefully positioned upon the blank with the flint glass segment disposed radially outwardly of the blank, and the crown glass segment radially inwardly. A pin or feeler 17 is then interposed between the innermost edge point 18 of the crown glass segment, that is, at the point diametrically opposite the outermost edge point 19 of the flint glass segment. Such outermost edge point of the flint segment will be supported by direct contact with the outermost edge point 20 of the countersink.

When the parts are thus positioned, as shown in Figure 3, the blank and button are subjected to heat to soften and fuse the flint glass segment. As this fusion occurs, the flint segment will begin gradually to sag, and a welding action will commence at the superposed points of contact 19, 20. The line of fusion will travel gradually from that point toward the point supported by the pin 17, and the fusion will be complete throughout the flint glass segment before the crown segment softens. After the line of fusion encounters the weld line 16 and the crown segment, it will halt momentarily, until the crown segment begins to soften.

As shown in Figure 4, the line of fusion has travelled from the point 19 to the line 16 and the flint glass segment is completely fused to the blank. The crown glass segment 13, however, has not yet softened, and is still spaced from the surface of the counter-sink by the pin 17. As the heat is continued, the crown segment will gradually soften, and will begin to fuse with the blank at the point of contact 21. The crown segment will continue to soften and will gradually sag down until the line of fusion has travelled entirely across the segment to the point supported by the pin 17.

The parts will then be in the position disclosed in Figure 5, and the pin may either be removed at that time, or left embedded in the glass to be ground away by the finishing operation.

After the lens blank of Figure 5 has cooled, its outer surface may be ground down to a continuous spherical curve and the blank is then ready for shipment to the optician.

It will be seen that the present invention provides a method of fusing a composite bifocal button to a lens blank which entirely prevents the formation of gas pockets or other blemishes on the fused surface. By this method, the button is welded to the blank by a progressively moving line of juncture which excludes air, steam and other gases as it moves across the face of the countersink. This result was impossible in prior art methods, whether one or more pins were used, because the flint segment always had a lower fusion point than the crown segment and air invariably became entrapped under the button when the flint segment sagged down, if an attempt was made to support the button by a pin or feeler under the flint segment.

This invention is not limited to supporting the crown glass segment by one pin only, as obviously a plurality of pins thereunder may be used for the sake of stability, if desired. The essential relation is that the glass segment having the lower melting point be supported by direct contact with the blank, and the opposite edge point of the other glass segment having the higher melting point be supported above the blank in spaced relation thereto.

Certain modifications of the present method will be obvious to those skilled in the art and all such changes as come within the scope of the appended claims, or their equivalents, are included within the present invention.

I claim:—

1. The method of fusing a composite bifocal button made up of segments of glass of different melting points to a circular lens blank having a countersink formed therein, comprising positioning the button over the countersink, supporting the edge of the segment of lower melting point by direct contact with said blank at one edge point of the countersink, supporting the opposite edge of the segment of higher melting point above the opposite edge of the countersink in spaced relation thereto, subjecting the button and blank to heat to soften first the segment of lower melting point and later the segment of higher melting point, and fusing the surface of the button to the countersink, progressively, from the point of contact of the segment of lower melting point with the blank, across the button to the edge of the segment of higher melting point supported above the opposite edge of the countersink.

2. The method of making a fused bifocal lens comprising forming a spherical countersink in the outer surface of a circular crown glass lens blank eccentric to the center thereof positioning a composite bifocal button having a segment of flint glass and another segment of crown glass having a higher melting point than the flint glass over said countersink with the flint glass segment disposed radially outwardly with respect to the center of said blank and with the crown glass segment disposed inwardly, supporting the outermost edge portion of the flint glass segment of the button in direct contact with the blank at the outer edge of the countersink, supporting the diametrically opposite edge portion of the crown glass segment of the button in spaced relation to the opposite edge of the countersink by the interposition of the pin adjacent that point, subjecting the blank and button to heat, first fusing the flint glass segment to the blank from the point of contact with the blank on its outer edge progressively inwardly by reason of its lower melting point and then fusing the crown glass segment of higher melting point from its central line of juncture with the flint glass segment progressively to the edge point supported by said pin.

3. The method of making a fused bifocal lens blank comprising welding two segments of glass of different indices of refraction and of different melting points together in edge to edge relation to form a substantiallly circular composite button, forming an eccentrically positioned countersink in a glass blank having the same index of refraction and melting point as one of said segments, positioning the composite button over said countersink with the segment of higher index and lower melting point disposed radially outwardly of the blank, supporting the outermost edge point of said segment by direct contact with said blank adjacent the outermost edge point of the countersink, supporting the diametrically opposite edge point of the other segment of high melting point in spaced relation to the opposite edge point of the countersink by the interposition of a pin at that point, subjecting the blank and composite button to heat and thereby softening the segment of lower melting point and of higher index and fusing the same to the blank progressively from the point of contact therewith radially inwardly, continuing the heat and thereby softening the segment of higher melting point and lower index, and fusing the same to the blank progressively from its welded edge to the point supported by said pin.

4. The method of making a fused bifocal lens blank comprising welding two segments of glass of different fusing points together in edge to edge relation to form a substantially circular composite button, forming an eccentrically positioned countersink in a glass blank having the same fusing point as the higher of said segments, positioning the composite button over said countersink with the segment of lower fusing point disposed radially outwardly of the blank, supporting the outermost edge point of said segment by direct contact with said blank adjacent the outermost edge point of the countersink, supporting the diametrically opposite edge point of the other segment having the same fusing point as that of the blank in spaced relation to the innermost edge point of the countersink by the interposition of a pin at that point, subjecting the blank and composite button to heat to soften the segment of lower fusing point, fusing the same to the blank progressively from the point of contact radially inwardly of the blank, continuing the heat to soften the segment of higher fusing point, and fusing the same to the blank progressively from its welded edge to the point supported by said pin.

5. The method of making a bifocal lens comprising molding a piece of crown glass of high melting point and a piece of flint glass of relatively lower melting point respectively into a crescent and a cissoid having certain arcuate edges adapted to form a substantially circular perimeter when their other arcuate edges are juxtaposed, grinding said last mentioned arcuate edges to a common arc, juxtaposing the same to produce a line of juncture passing through the center of said circular perimeter, welding the parts together on said line of juncture, grinding a lenticular surface on one face of the composite button thus produced, superposing the button over a preformed eccentrically positioned countersink in a major, crown glass lens blank of high melting point with said lenticular face down, supporting the flint glass cissoid portion of lower melting point of the button by direct contact with the radially outer edge of the eccentrically positioned countersink, supporting the crown glass crescent portion of high melting point of the button above the countersink by a pin, subjecting the button and blank to heat and fusing them together by a progressively moving fuse line travelling from the point of contact between the flint glass cissoid portion of lower melting point and the blank, across the countersink to the opposite side of the crown glass crescent portion of high melting point, supported by the pin.

CARL G. HAERING.